(12) United States Patent
Sheth et al.

(10) Patent No.: US 9,131,316 B2
(45) Date of Patent: Sep. 8, 2015

(54) SHARING PUBLIC ADDRESSING SYSTEM USING PERSONAL COMMUNICATION DEVICES IN AN AD-HOC NETWORK

(75) Inventors: Soham V. Sheth, San Diego, CA (US); Huey Trando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 12/333,127

(22) Filed: Dec. 11, 2008

(65) Prior Publication Data

US 2010/0150373 A1 Jun. 17, 2010

(51) Int. Cl.
| | | |
|---|---|---|
| *H04R 25/00* | (2006.01) | |
| *H04R 27/00* | (2006.01) | |
| *H04R 5/04* | (2006.01) | |
| *H04R 29/00* | (2006.01) | |
| *H04R 3/12* | (2006.01) | |
| *H04M 9/08* | (2006.01) | |

(52) U.S. Cl.
CPC .................. *H04R 27/00* (2013.01); *H04R 5/04* (2013.01); *H04M 9/08* (2013.01); *H04R 3/12* (2013.01); *H04R 29/007* (2013.01)

(58) Field of Classification Search
CPC ............ H04R 27/00; H04R 5/04; H04R 3/12; H04R 2420/07; H04R 27/02; H04R 29/007; H04R 1/02; H04H 20/83
USPC ................. 381/80, 81, 82; 395/835; 434/350; 455/422.1, 414.1, 412.2
See application file for complete search history.

(56) References Cited

U.S. PATENT DOCUMENTS

| | | | |
|---|---|---|---|
| 5,860,023 A | | 1/1999 | Tognazzini |
| 6,332,163 B1 * | | 12/2001 | Bowman-Amuah .......... 709/231 |
| 6,741,856 B2 * | | 5/2004 | Graziano et al. ........... 455/422.1 |
| 6,954,641 B2 * | | 10/2005 | McKenna et al. .......... 455/435.1 |
| 7,477,659 B1 * | | 1/2009 | Nee et al. ...................... 370/468 |
| 2002/0019228 A1 * | | 2/2002 | McKenna et al. ............. 455/435 |
| 2002/0037716 A1 * | | 3/2002 | McKenna et al. ............. 455/422 |
| 2003/0169720 A1 | | 9/2003 | Sebastian et al. |
| 2004/0033478 A1 * | | 2/2004 | Knowles et al. .............. 434/350 |
| 2004/0137929 A1 * | | 7/2004 | Jones et al. ................... 455/517 |
| 2005/0144200 A1 | | 6/2005 | Hesselink et al. |
| 2005/0201370 A1 * | | 9/2005 | Poyhonen et al. ............ 370/389 |
| 2006/0103721 A1 | | 5/2006 | Shih et al. |

(Continued)

FOREIGN PATENT DOCUMENTS

| | | |
|---|---|---|
| DE | 10124337 | 11/2002 |
| JP | H08298653 A | 11/1996 |

(Continued)

OTHER PUBLICATIONS

International Preliminary Report on Patentability—PCT/US2009/067633, The International Bureau of WIPO—Geneva, Switzerland, Feb. 1, 2011.

(Continued)

*Primary Examiner* — Thinh T Nguyen
(74) *Attorney, Agent, or Firm* — Joseph Hanasz

(57) ABSTRACT

A method, system, and computer program product for using a personal communication device as a microphone in a seminar or conference setting. A client is electrically connected to a PA system and one of many hosts can access the PA system by associating with the client. The association can be transferred by the client or the host. Tokens can be generated for each transfer and a map can be created and stored.

49 Claims, 2 Drawing Sheets

(56) References Cited

U.S. PATENT DOCUMENTS

2007/0297581 A1* 12/2007 Kuo et al. .................. 379/93.26
2012/0269362 A1  10/2012 Sheth et al.

FOREIGN PATENT DOCUMENTS

| | | |
|---|---|---|
| JP | 2001298782 A | 10/2001 |
| JP | 2003061183 A | 2/2003 |
| JP | 2005514804 A | 5/2005 |
| JP | 2005536133 A | 11/2005 |
| JP | 2007124488 A | 5/2007 |
| JP | 2007266992 A | 10/2007 |
| JP | 2007318395 A | 12/2007 |
| JP | 2007324768 A | 12/2007 |
| JP | 2008072195 A | 3/2008 |
| WO | 2004017662 A2 | 2/2004 |
| WO | WO2007015154 | 2/2007 |

OTHER PUBLICATIONS

International Search Report and Written Opinion—PCT/US2009/067633, International Search Authority—European Patent Office—Sep. 17, 2010.

Radio Equipment and Systems (RES); Digital Enhanced Cordless Telecommunications (DECT); Common Interface (CI); Part 1: Overview; ETS 300 175-1 ETSI Standards, LIS, Sophia Antipolis Cedex, France, vol. DECT, No. Second Edition, Sep. 1, 1996.

Unknown: "DCN Architects and engineers specifications" Art of Congress Architect Specs, Philips, Eindhoven, NL, Mar. 16, 2003. page Complete, XP002334459 p. 6-p. 120 p. 38-p. 43.

* cited by examiner

SHARING PUBLIC ADDRESSING SYSTEM USING PERSONAL COMMUNICATION DEVICES IN AN AD-HOC NETWORK

REFERENCE TO CO-PENDING APPLICATIONS FOR PATENT

The present Application for Patent is related to the following co-pending U.S. Patent Applications:

"Wireless Architecture for a Traditional Wire-Based Protocol", U.S. patent application Ser. No. 12/179,411, filed Jul. 24, 2008, which claims priority to "Wireless Architecture for a Traditional Wire-Based Protocol", U.S. Provisional Patent Application Ser. No. 60/951,919 filed Jul. 25, 2007;

"Apparatus and Methods for Establishing Client-Host Associations Within a Wireless Network", U.S. patent application Ser. No. 12/098,025, filed Apr. 4, 2008; and

BACKGROUND

1. Field

The presently claimed invention relates generally to communication systems, and more specifically to a method, system, and computer program product for using a personal communication device, such as a mobile phone, as a public address microphone in a local area network.

2. Background

During a seminar or conference, one or more speakers give out speeches to the audience in a conference or lecture hall. Usually, a cordless/corded microphone is used during such speeches. The speakers would rotate the microphone to the next speaker. Also, if anyone in the audience has questions or comments, a microphone is rotated amongst the audience. At times, meeting coordinators end up running around to hand over microphones to the audience and/or speakers. In the alternative, several microphones are located in the audience area and they are manually activated for speakers based on the closest microphone to the chosen speaker. Thus, a system is necessary to simplify the process and to avoid the use of specific microphone devices and use devices that most users already have in their possession to replace and use in lieu of the specific microphone devices.

SUMMARY

Aspects disclosed herein address the above stated needs by a user using his/her Personal Communication Device (PCD) as a public addressing microphone. Presently, almost everyone uses personal devices for communication. The presently claimed invention solves the above problem using a personal communication device, such as a cellular phone as a microphone for public addressing during a public gathering such as seminar, conference, or the like. While this proposal focuses on using wireless devices for this solution, it is also possible to implement a similar solution using fixed or wired communication devices and a network.

In a first aspect of the claimed invention a client is electrically connected to a PA system and is associated with a host. In a second aspect, a first host is associated with the client, and a second host is granted permission to transfer the association to the second host. The permission can be granted by the client or the first host. In a third aspect, the client is configured to associate with a first host and a second host requests the association. The first host can grant the association by generating a permission whereby the association is handed over to the second host. The permission can be granted for a specific amount of time or terminated at the will of the first host. A token can be generated each time the association is transferred and a map can be generated and stored for the association transfer.

DETAILED DESCRIPTION

The word "exemplary" is used herein to mean "serving as an example, instance, or illustration." Any aspect described herein as "exemplary" is not necessarily to be construed as preferred or advantageous over other aspects.

Figure 1:
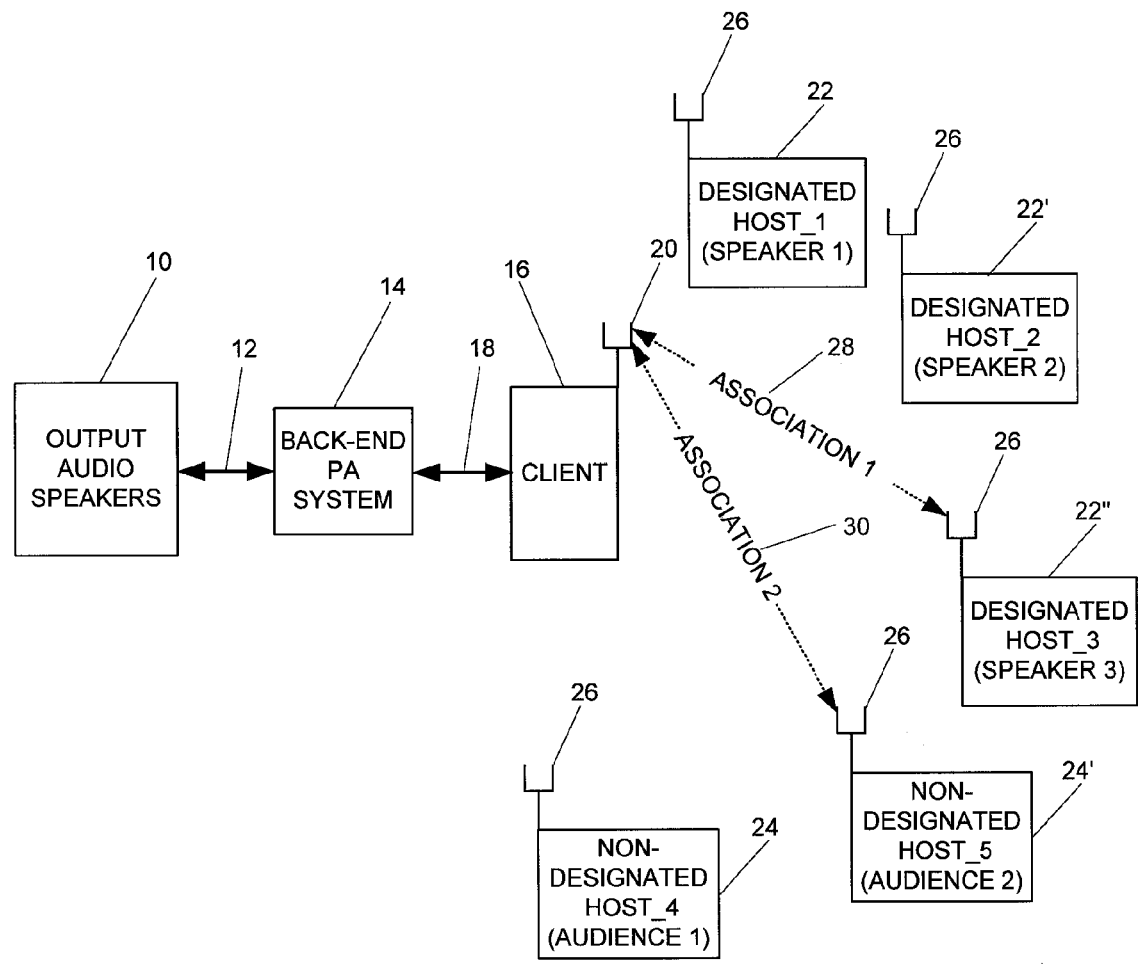
FIG. 1 is an exemplary system using the presently claimed invention.

This scheme allows any user to use his/her PCD as a public addressing microphone. FIG. 1 shows an exemplary system using the presently claimed invention. As in most public address (PA) systems, at least one output audio speaker 10 is connected 12 to a back end of PA system 14. This connection can be of any type of connection known in the art, including but not limited to electrical connections, optical connections and the like. Client 16 is the entity that provides audio feed 18 to back-end PA system 14. As shown, client 16 has an antenna or transceiver system 20 to receive and transmit data to hosts. The hosts in this exemplary aspect include Designated Host_1 22, Designated Host_2 22' and Designated Host_3 22", which are designated as the speakers, and Non-Designated Host_4 24 and Non-Designated Host_5 24', which are not designated as the speakers, hence the audience. Each of the hosts has a host antenna or transceiver system 26 for receiving and transmitting data to client 16, during Association 1 28 and Association 2 30. The operation of the system is described below.

Operation

Event coordinator may configure a client to designate the one or more users' PCDs as masters. The devices configured as master would have more control and privileges on the back-end PA system. Henceforth, devices configured as masters are called designated hosts, whereas, other devices are called non-designated hosts. Non-designated hosts access the PA system at the will of the designated hosts. In the speaker-audience usage scenario, speakers' devices act as designated hosts, whereas, audiences' devices act as non-designated hosts. While this disclosure suggests use of designated and non-designated hosts in speaker-audience scenario, it is also possible to have one or all non-designated hosts, one designated host or all designated hosts. In case of the all non-designated hosts, predetermined criteria can be used to select the host that can use the PA system. The client may participate in making such decisions.

Figure 2:
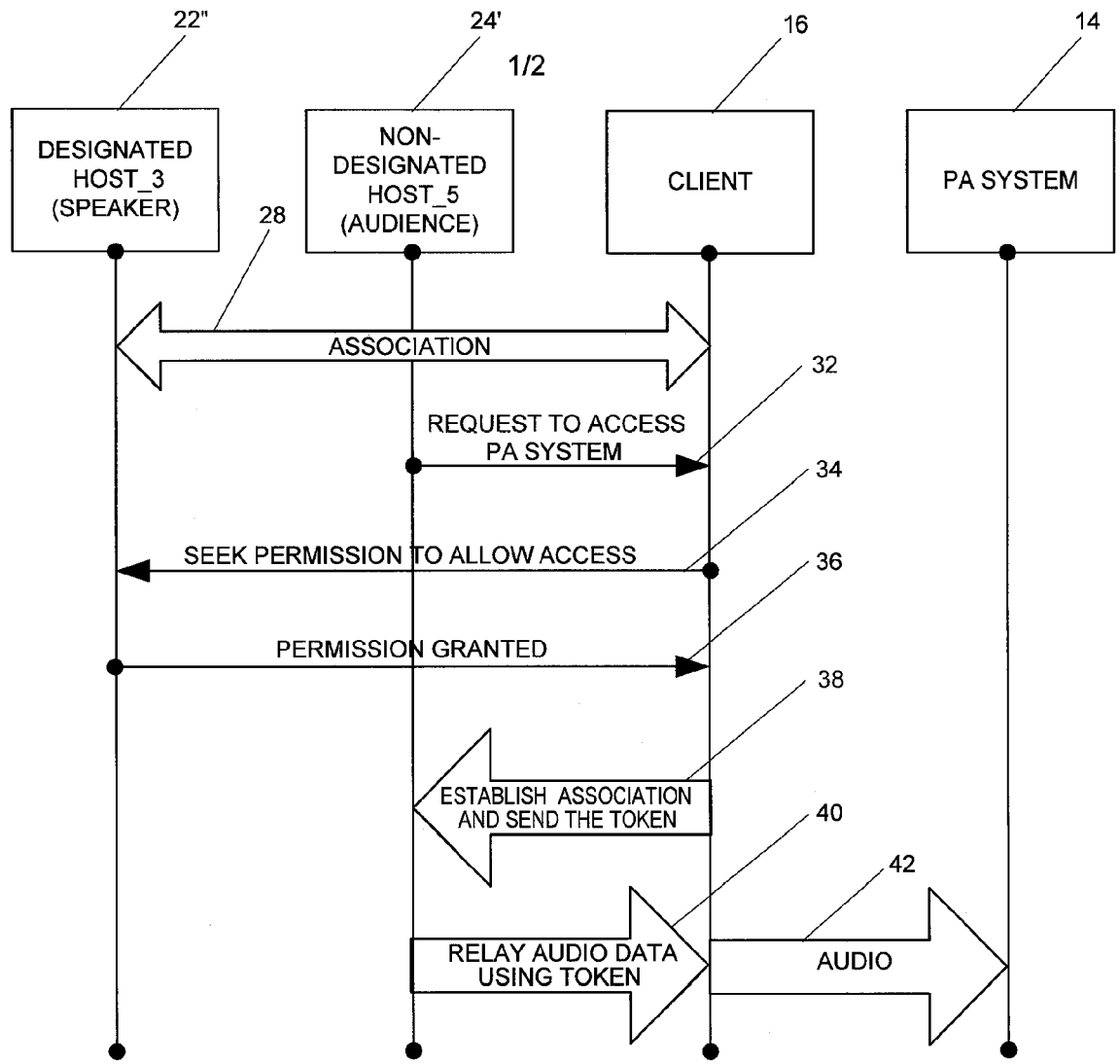
FIG. 2 is chart showing the operation of the system of FIG. 1.

The operation of the claimed system is shown in FIG. 2. In a first aspect, an event coordinator configures client 16 to designate Designated Host_3 22" as one of the speakers. Designated Host_3 22" establishes an Association 1 28 with client 16, when Designated Host_3 22" wants to access PA system 14. Client 16 is the entity that provides the audio feed to the back-end PA system 14 (e.g., amplifier, audio speakers). When the current speaker, Designated Host_3 22", is done speaking or using PA system 14, he may dissociate from client 16. The scenario for this first aspect ends here.

However, in a second aspect it is also possible that a next designated speaker, for instance Designated Host_2 22' of FIG. 1, may take over the association ownership (equivalent to rotating microphone) from the current speaker, Designated Host_3 22". The handover of the association ownership is described in co-pending U.S. Patent Application entitled "Apparatus and Methods for Establishing Client-Host Associations Within a Wireless Network", U.S. patent application Ser. No. 12/098,025, filed Apr. 4, 2008, and incorporated herein by reference. Once the association is transferred, client 16 maintains the information about the new speaker, Designated Host_2 22'. This describes a second aspect for the currently claimed invention.

Referring again to FIG. 2, in a third aspect, when a person from the audience Non-Designated Host_5 24' needs to ask a question or make a comment, he/she uses his/her PCD. Upon activation, the PCD makes a request for an Association 2 32 with client 16. Client 16 in-turn seeks the permission 34 from the speaker currently having the privilege to use the PA system, in this case Designated Host_3 22". Speaker, Designated Host_3 22", may grant permission to one of the many requesters in the audience, in this case Non-Designated Host_5 24', to access the PA system. This permission may be for a limited duration or open until it is ended either by the speaker, Designated Host_3 22", or audience, Non-Designated Host_5 24'. If the speaker, Designated Host_3 22", grants permission 36, client 16 generates a token 38 and sends it to the accepted host, in this case Non-Designated Host_5 24'. Client 16 also maintains the mapping for current token, the designated host and non-designated host, in this case Designated Host_3 22" and Non-Designated Host_5 24'. Upon receipt of the token and granted association permission 36, via establish requested association, and send token 38, Non-Designated Host_5 24' starts sending the audio data and the assigned token 40 to client 16. After verifying the token and sender's identity from the mapping, client 16 feeds the received audio data 42 to the PA system 14. Hence, the selected person's question/comment gets aired. When Non-Designated Host_5 24' is done using the PA system, it may terminate the association with client 16.

If the speaker, Designated Host_3 22", wants to repossess the ownership of PA system 14 at any point, it does so by notifying client 16. As a result, client 16 purges the token 38 and the host mapping while dissociating from the current non-designated host, Non-designated Host_5 24', and hence ends the access permission 36 provided to Non-Designated Host_5 24'.

Referring again to FIG. 1, the speaker, Designated Host_3 22", may grant access or permission to another audience member, for example Non-Designated Host_4 24 even if Non-Designated Host_5 24', is active. In such an event, client 16 generates a new token, overwrites the existing token, updates the host mapping with the Non-Designated Host_4 24 identity, releases the association with Non-Designated Host_5 24', the previous non-designated host, and notifies access permission and allocated token to Non-Designated Host_4 24, as previously described in FIG. 2. Non-Designated Host_4 24 uses the assigned token while sending the audio data to client 16. Upon successful verification as described above, client 16 feeds the data 42 to PA system 14.

If another speaker, for example Designated Host_2 22' takes over the association ownership, client 16 confirms the permission from the new designated host, Designated Host_2 22', in order to allow current non-designated host, Non-Designated Host_5 24', to continue using PA system 14. If the new designated host, Designated Host_2 22', grants the permission, client 16 updates the mapping table using the information from the new designated host, Designated Host_2 22'. However, if the new designated host, Designated Host_2 22' denies the permission, client 16 flushes the token, and the designated and non-designated host mapping while dissociating from the current non-designated host, Non-designated Host_5 24'. Hence, it stops airing audio data from any non-designated host until new permissions are granted by a new speaker, Designated Host_2 22'.

In yet another aspect of the claimed invention, client 16 can directly grant access to PA system 14 without seeking permission from the current host.

In another aspect, client 16, when associated with a designated host, may notify the requester (i.e. audience) that it (client 16) would callback when the response is received from the current designated host.

In yet another aspect, client 16 may store the requests from the multiple users from the audience (non-designated hosts) along with their profile. It may then forward each of the received requests to the speaker (i.e. designated host) sequentially or using a predetermined priority criteria. Client 16 may filter out one or more requests using a predetermined criteria and profile information of the requesting user from the audience.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein, and which may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the presently claimed invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the presently claimed invention. Various modifications to these aspects will be readily apparent to those skilled in the art, and the generic principles defined herein may be applied to other aspects without departing from the spirit or scope of the claimed invention. Thus, the presently claimed invention is not intended to be limited to the aspects shown herein, but is to be accorded the widest scope consistent with the principles and novel features disclosed herein.

The invention claimed is:

1. A method of using a client device with a public addressing audio system, the method comprising the steps of:
    communicatively coupling the client device to an audio system of the public addressing audio system;
    associating the client device with at least one first cellular wireless device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
    receiving audio and data from the at least one first wireless cellular device; and
    granting permission for a second wireless cellular device to transmit audio data by generating and transmitting a token to the second wireless cellular device, wherein transmission of the token enables the second wireless cellular device to send the audio data and the token to the client device, enabling audio communication from the second wireless cellular device over the public addressing audio system via the client device.

2. A system for using a client device with a public addressing audio system, the system comprising:
    means for communicatively coupling the client device to an audio system of the public addressing audio system;
    means for associating the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
    means for receiving audio and data from the at least one first wireless cellular device; and
    means for granting permission for a second wireless cellular device to transmit audio data by generating and transmitting a token to the second wireless cellular device, wherein transmission of the token enables the second wireless cellular device to send the audio data and the token to the client device, enabling audio communication from the second wireless cellular device over the public addressing audio system via the client device.

3. A method of using a client device with a public addressing audio system, the method comprising the steps of:
    communicatively coupling the client device to an audio system of the public addressing audio system;
    associating the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
    providing a permission to transfer the association to at least one second wireless cellular device by generating and transmitting a token to at least one second wireless cellular device, wherein transmission of the token enables the at least one second wireless cellular device to send the audio data and the token to the client device;
    transferring the association to at least one second wireless cellular device, wherein the at least one second wireless cellular device obtains access to the public addressing audio system; and
    receiving audio and data from the at least one second wireless cellular device.

4. The method of claim 3 wherein the permission to transfer the association is granted by the client device.

5. The method of claim 3 wherein the permission to transfer the association is granted by the at least one first wireless cellular device.

6. A system for using a client device with a public addressing audio system, the system comprising:
    means for communicatively coupling the client device to an audio system of the public addressing audio system;
    means for associating the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
    means for providing a permission to transfer the association to at least one second wireless cellular device by generating and transmitting a token to at least one second wireless cellular device, wherein transmission of the token enables the at least one second wireless cellular device to send the audio data and the token to the client device;
    means for transferring the association to the at least one second wireless cellular device, wherein the at least one second wireless cellular device obtains access to the public addressing audio system; and
    means for receiving audio and data from the at least one second wireless cellular device.

7. The system of claim 6 wherein the means for providing the permission to transfer the association is granted by the client device.

8. The system of claim 6 wherein the permission to transfer the association is granted by the at least one first wireless cellular device.

9. A method of using a client device in a public addressing audio system, the method comprising the steps of:
    communicatively coupling the client device to an audio system of the public addressing audio system;
    associating the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;

generating a permission for an association between the client device and at least one second wireless cellular device;

handing over the association with the at least first wireless cellular device to the at least one second wireless cellular device by generating and transmitting a token to at least one second wireless cellular device, wherein transmission of the token enables the at least one second wireless cellular device to send the audio data and the token to the client device; and receiving audio and data from the at least one second wireless cellular device.

10. The method of claim 9 wherein the at least one first wireless cellular device and the at least one second wireless cellular device are designated wireless cellular devices.

11. The method of claim 9 wherein the at least one first wireless cellular device comprises a designated wireless cellular device and the at least one second wireless cellular device comprises a non-designated wireless cellular device.

12. The method of claim 9 further comprising the step of disassociating the at least one first wireless cellular device from the client device.

13. The method of claim 9 wherein the step of generating a permission is based on a request for permission from the at least one second wireless cellular device.

14. The method of claim 9 wherein the step of generating a permission comprises the client device requesting the permission from the at least one first wireless cellular device.

15. The method of claim 9 wherein the step of handing over the association comprises a predetermined time interval.

16. The method of claim 9 wherein the step of handing over the association comprises a termination instruction.

17. The method of claim 9 wherein the step of handing over the association comprises the client device generating the token and sending the token to the at least one second wireless cellular device.

18. The method of claim 17 further comprising the step of mapping the token, the at least one first wireless cellular device and the at least one second wireless cellular device.

19. The method of claim 18 wherein the step of mapping comprises updating a map upon transfer of the association.

20. The method of claim 9 further comprising the step of terminating the association of the at least one second wireless cellular device and handing over the association to at least one third wireless cellular device.

21. The method of claim 20 further comprising the steps of the client device generating a second token and sending the second token to the at least one third wireless cellular device and updating a map.

22. The method of claim 9 further comprising the step of receiving a retrieval request of the association from the at least one first wireless cellular device.

23. The method of claim 9 further comprising the step of calling back the at least one second wireless cellular device upon receipt of a response from the at least one first wireless cellular device.

24. The method of claim 9 further comprising the step of storing requests for the association in a database.

25. The method of claim 9 further comprising the step of sending a profile of the at least one second wireless cellular device.

26. The method of claim 9 further comprising the step of receiving a call back from the at least one first wireless cellular device to allow the access to the at least one second wireless cellular device.

27. A system for using a client device with a public addressing audio system, the system comprising:

means for communicatively coupling the client device to an audio system of the public addressing audio system;

means for associating the client device with the at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;

means for generating a permission for an association between the client device and the at least one second wireless cellular device;

means for handing over the association with the at least first wireless cellular device to the at least one second wireless cellular device by generating and transmitting a token to at least one second wireless cellular device, wherein transmission of the token enables the at least one second wireless cellular device to send the audio data and the token to the client device; and means for receiving audio and data from the at least one second wireless cellular device.

28. The system of claim 27 wherein the at least one first wireless cellular device and the at least one second wireless cellular device are designated wireless cellular devices.

29. The system of claim 27 wherein the at least one first wireless cellular device comprises a designated wireless cellular device and the at least one second wireless cellular device comprises a non-designated wireless cellular device.

30. The system of claim 27 further comprising means for disassociating the at least one first wireless cellular device from the client device.

31. The system of claim 27 wherein generating the permission is based on a request for permission from the at least one second wireless cellular device.

32. The system of claim 27 wherein the means for generating a permission comprises means for requesting the permission by the client device from the at least one first wireless cellular device.

33. The system of claim 27 wherein the means for handing over the association comprises a predetermined time interval.

34. The system of claim 27 wherein the means for handing over the association comprises a termination instruction.

35. The system of claim 27 wherein the means for handing over the association comprises means for generating the token by the client device and sending the token to the at least one second wireless cellular device.

36. The system of claim 35 further comprising means for mapping the token, the at least one first wireless cellular device and the at least one second wireless cellular device.

37. The system of claim 36 wherein the means for mapping comprises means for updating a map upon transfer of the association.

38. The system of claim 27 further comprising means for terminating the association of the at least one second wireless cellular device and means for handing over the association to at least one third wireless cellular device.

39. The system of claim 38 further comprising means for generating a second token by the client device and sending the second token to the at least one third wireless cellular device and means for updating a map.

40. The system of claim 27 further comprising means for receiving a retrieval request of the association from the at least one first wireless cellular device.

41. The system of claim 27 further comprising means for calling back the at least one second wireless cellular device upon receipt of a response from the at least one first wireless cellular device.

42. The system of claim 27 further comprising means for storing requests for the association in a database.

43. The system of claim 27 further comprising means for sending a profile of the at least one second wireless cellular device.

44. The system of claim 27 further comprising means for receiving a calling back from the at least one first wireless cellular device to allow the access to the at least one second wireless cellular device.

45. The method of claim 1 further comprising:
providing a permission to transfer an association between the client device and at least one first cellular wireless device to at least one second wireless cellular device, wherein the permission to transfer the association is granted by the client device or the at least one first wireless cellular device;
generating the token at the client device and sending the token from the client device to the at least one second wireless cellular device;
mapping the token, the at least one first wireless cellular device and the at least one second wireless cellular device, wherein the at least one second wireless cellular device obtains access to the public addressing audio system; and
receiving audio and data from the at least second wireless cellular device.

46. The method of claim 1, wherein the at least one first wireless cellular device is a wireless device capable of communicating in a wireless cellular network that is different than a wireless network that is used to communicate between the client device and the first wireless cellular device.

47. A non-transitory machine-readable medium comprising instructions for a client device to be used with a public addressing audio system, which when executed by a processor causes the processor to:
communicatively couple the client device to an audio system of the public addressing audio system;
associate the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
receive audio and data from the at least one first wireless cellular device; and
grant permission for a second wireless cellular device to transmit audio data by generating and transmitting a token to the second wireless cellular device, wherein transmission of the token causes the second wireless cellular device to send the audio data and the token to the client device, enabling audio communication from the second wireless cellular device over the public addressing audio system via the client device.

48. A non-transitory machine-readable medium comprising instructions for a client device to be used with a public addressing audio system, which when executed by a processor causes the processor to:
communicatively couple the client device to an audio system of the public addressing audio system;
associate the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
provide a permission to transfer the association to at least one second wireless cellular device by generating and transmitting a token to at least one second wireless cellular device, wherein transmission of the token enables the at least one second wireless cellular device to send the audio data and the token to the client device;
transfer the association to at least one second wireless cellular device, wherein the at least one second wireless cellular device obtains access to the public addressing audio system; and
receive audio and data from the at least one second wireless cellular device.

49. A non-transitory machine-readable medium comprising instructions for a client device to be used with a public addressing audio system, which when executed by a processor causes the processor to:
communicatively couple the client device to an audio system of the public addressing audio system;
associate the client device with at least one first wireless cellular device via an ad-hoc network, wherein the at least one first wireless cellular device (i) obtains access to the public addressing audio system and (ii) is used as a microphone for audio communication over the public addressing audio system to multiple persons located in a single venue via a loudspeaker;
generate a permission for an association between the client device and at least one second wireless cellular device;
hand over the association with the at least first wireless cellular device to the at least one second wireless cellular device by generating and transmitting a token to at least one second wireless cellular device, wherein transmission of the token enables the at least one second wireless cellular device to send the audio data and the token to the client device; and
receive audio and data from the at least one second wireless cellular device.

\* \* \* \* \*